(12) United States Patent
Johnson et al.

(10) Patent No.: US 9,280,919 B2
(45) Date of Patent: Mar. 8, 2016

(54) METHOD OF GENERATING ANTHROPOMOPHIC VEHICLE IMAGES

(75) Inventors: Richard A. Johnson, Rochester Hills, MI (US); Michael A. Wuergler, Rochester Hills, MI (US)

(73) Assignees: GM Global Technology Operations LLC, Detroit, MI (US); General Motors LLC, Detroit, MI (US)

( * ) Notice: Subject to any disclaimer, the term of this patent is extended or adjusted under 35 U.S.C. 154(b) by 444 days.

(21) Appl. No.: 13/526,316

(22) Filed: Jun. 18, 2012

(65) Prior Publication Data

US 2013/0335449 A1 Dec. 19, 2013

(51) Int. Cl.
*G06T 13/40* (2011.01)
*G09B 29/10* (2006.01)

(52) U.S. Cl.
CPC .............. *G09B 29/106* (2013.01); *G06T 13/40* (2013.01)

(58) Field of Classification Search
CPC .... G06T 19/006; G06T 13/40; G09B 29/106; G06F 2203/011; G06F 3/0482
See application file for complete search history.

(56) References Cited

U.S. PATENT DOCUMENTS

| | | | |
|---|---|---|---|
| 7,668,652 B2 * | 2/2010 | Spencer et al. | 701/526 |
| 2007/0298866 A1 * | 12/2007 | Gaudiano et al. | 463/23 |
| 2008/0269958 A1 * | 10/2008 | Filev et al. | 701/1 |
| 2009/0024317 A1 * | 1/2009 | Aase et al. | 701/209 |
| 2009/0079705 A1 * | 3/2009 | Sizelove et al. | 345/173 |
| 2009/0144622 A1 | 6/2009 | Evans et al. | |
| 2010/0127847 A1 * | 5/2010 | Evans et al. | 340/461 |

FOREIGN PATENT DOCUMENTS

WO WO 2013130036 A1 * 9/2013 ............. B60R 25/10

OTHER PUBLICATIONS

Mark Sandritter, "How to Change a vehicle on a Garmin Nuvi," eHow, http://www.ehow.com/how_4488559_change-vehicle-garmin-nuvi.html, Dec. 19, 2008.*

* cited by examiner

*Primary Examiner* — Kee M Tung
*Assistant Examiner* — Nicholas R Wilson
(74) *Attorney, Agent, or Firm* — Chris DeVries; Reising Ethington, P.C.

(57) ABSTRACT

A method of generating anthropomorphic vehicle images for a vehicle owner is shown that includes providing a plurality of anthropomorphic vehicle images on a visual display for a vehicle owner to select; receiving a selection of an anthropomorphic vehicle image from the vehicle owner using a wireless device; obtaining vehicle data using one or more vehicle sensors located on the vehicle; altering at least a portion of the selected anthropomorphic vehicle image based on the accessed vehicle data; and displaying the altered anthropomorphic vehicle image on a wireless device to the vehicle owner.

8 Claims, 3 Drawing Sheets

METHOD OF GENERATING ANTHROPOMOPHIC VEHICLE IMAGES

TECHNICAL FIELD

The present invention relates generally to artistic vehicle images and more particularly to artistic vehicle images having anthropomorphic features.

BACKGROUND OF THE INVENTION

In the past, vehicle manufacturers directed most of their energy toward the design, production, and sale of automobiles. This related almost exclusively to elements or products sold with the vehicle to an end customer. However, vehicle manufacturers have turned more of their attention toward developing vehicle-related products that can be used outside of the vehicle. For example, customers who purchase vehicles also frequently carry wireless devices. And at least some vehicle features and/or functions can be more tightly integrated with the functionality of the wireless device. In one example, the wireless device—often called a Smartphone—can wirelessly communicate with a vehicle telematics unit carried by the vehicle using short-range wireless communications protocols. Through these communications, the wireless devices can receive data from the vehicle as well as transmit commands to the vehicle. In another example, customers also may use a personal computer (PC)) to access a website that can provide data relating to vehicle function or operation.

Using PCs and/or wireless devices to receive vehicle-related information can strengthen a customer's connection to the vehicle. Thus, increasing the frequency and ease with which the customer uses the PC and/or wireless device for vehicle-related information can also help create a positive perception of the vehicle. It is possible to create a software application for a wireless device that creates more interest in using the PC and/or the wireless device for vehicle related activities.

SUMMARY OF THE INVENTION

According to an aspect of the invention, there is provided a method of generating anthropomorphic vehicle images for a vehicle owner. The method includes providing a plurality of anthropomorphic vehicle images on a visual display for a vehicle owner to select; receiving a selection of an anthropomorphic vehicle image from the vehicle owner using a wireless device; obtaining vehicle data using one or more vehicle sensors located on the vehicle; altering at least a portion of the selected anthropomorphic vehicle image based on the accessed vehicle data; and displaying the altered anthropomorphic vehicle image on a wireless device to the vehicle owner.

According to another aspect of the invention, there is provided a method of generating anthropomorphic vehicle images for a vehicle owner. The method includes providing a plurality of anthropomorphic vehicle images on a visual display for a vehicle owner to select; receiving from the vehicle owner via a wireless device a selection from among the plurality of anthropomorphic vehicle images; determining the location of the vehicle using a global positioning system (GPS) module carried by the vehicle; creating a geographical map based on the location of the vehicle; superimposing the selected anthropomorphic vehicle image over the geographical map based on the location of the vehicle; and displaying the superimposed anthropomorphic vehicle image and geographical map to the vehicle owner.

According to yet another aspect of the invention, there is provided a method of generating anthropomorphic vehicle images for a vehicle owner. The method includes providing a plurality of anthropomorphic vehicle images to a vehicle owner on a visual display, wherein each of the anthropomorphic vehicle images includes one or more artistic images of informational gauges that represent a function of the vehicle; receiving from the vehicle owner a selection from among the plurality of anthropomorphic vehicle images; providing a plurality of vehicle component images and vehicle environment images on a visual display from which the vehicle owner can choose; receiving from the vehicle owner a selection from among the plurality of vehicle component images and vehicle environment images; changing the selected anthropomorphic vehicle image to include the selected vehicle component image, the selected vehicle environment image, or both; gathering vehicle operational data from vehicle sensors onboard the vehicle; and visually communicating at least some of the gathered vehicle operational data to the vehicle owner by altering one or more artistic images of informational gauges included with the anthropomorphic vehicle image; and displaying the altered anthropomorphic vehicle image on the visual display.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE ILLUSTRATED EMBODIMENTS

A software application can be used by a device having computing resources, such as a wireless device or a personal computer, to provide a plurality of anthropomorphic vehicle images on a visual display for a vehicle owner. The anthropomorphic images can be artistic images of a vehicle that are customizable by the vehicle owner to reflect the owner's taste or interpretation of the vehicle's appearance. The anthropomorphic quality of these images can help personalize the car in such a way that the vehicle can begin to take on a personality the vehicle owner can relate to—and even bond with. By changing the appearance of the vehicle image shown on the visual display, the vehicle owner can envision their vehicle less as transportation and more like a reflection of his own personality.

Additionally, the anthropomorphic images chosen by the vehicle owner can be animated or altered based on vehicle data gathered at the vehicle. By doing so, the anthropomorphic vehicle image can convey vehicle data to the vehicle owner via the visual display. As an example, tire pressure sensor data can indicate that a low pressure condition exists on the vehicle. In response, the anthropomorphic vehicle image can change based on the low pressure condition to show a poorly-inflated or flat tire on the artistic rendering of the vehicle or perhaps a more emotional depiction such as a sad or sick tire. Other vehicle conditions can be conveyed by animating or altering the anthropomorphic vehicle image. By altering or animating the anthropomorphic vehicle image, the artistic vehicle can express human emotion or reactions to conditions both closely and distantly related to vehicle operation. For instance, if a weather forecast calls for mostly sunny skies, the anthropomorphic vehicle image can be altered to include a pair of sunglasses across the windshield or headlights of the vehicle. These are but a few examples of which more will be provided and discussed below.

Figure 1:
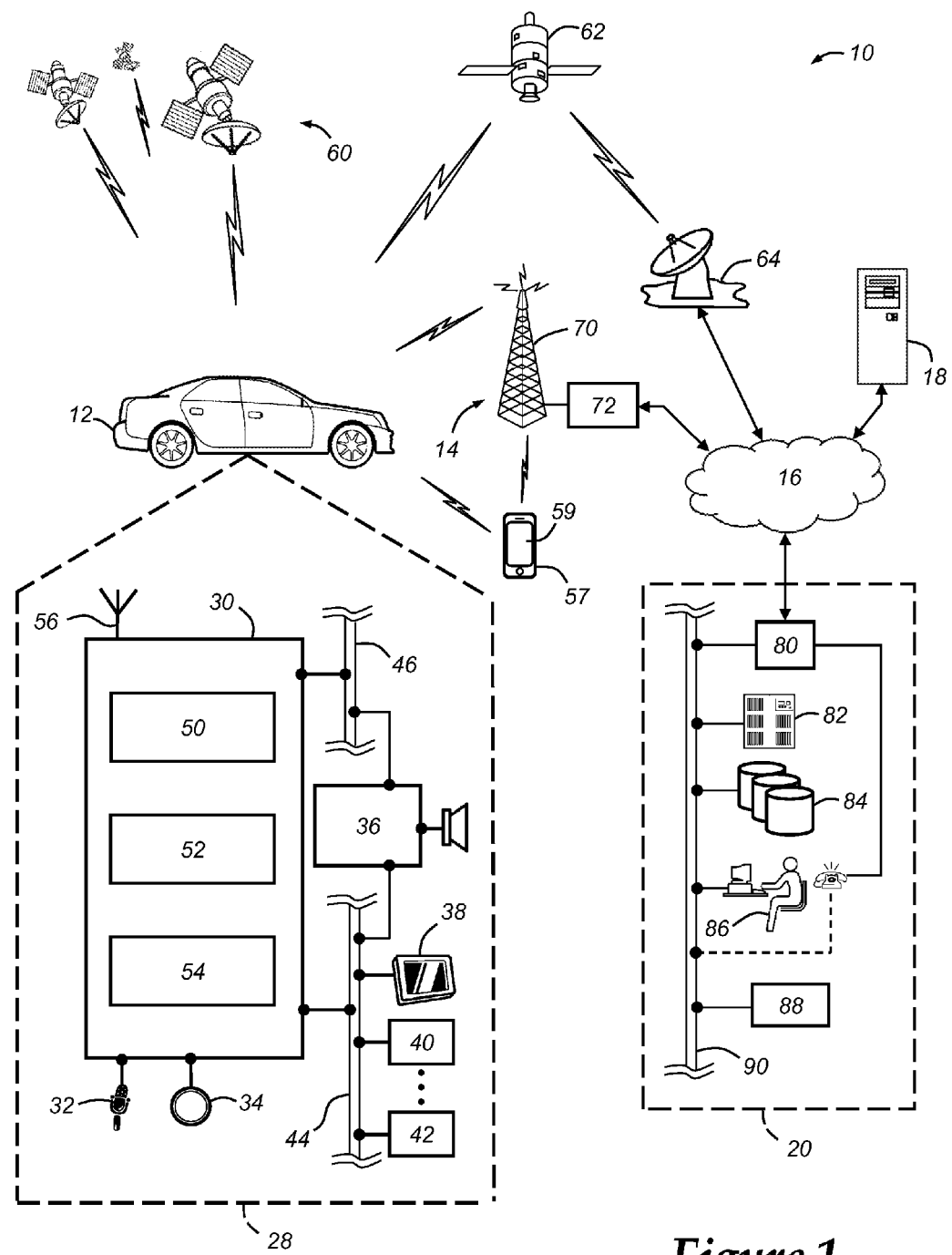
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

One of the networked devices that can communicate with the telematics unit 30 is a smartphone 57 or other similar wireless device. The smartphone 57 can include computer processing capability, a transceiver capable of communicating using a short-range wireless protocol, and a visual smartphone display 59. In some implementations, the smartphone display 59 also includes a touch-screen graphical user interface and/or a GPS module capable of receiving GPS satellite signals and generating GPS coordinates based on those signals. Examples of the smartphone 57 include the iPhone™ manufactured by Apple, Inc. and the Android™ manufactured by Motorola, Inc. While the smartphone 57 may also include the ability to communicate via cellular communications using the wireless carrier system 14, this is not always the case. For instance, Apple manufactures devices such as the iPad™, iPad 2™, and the iPod Touch™ that include the processing capability, the display 59, and the ability to communicate over a short-range wireless communication link. However, the iPod Touch and some iPads do not have cellular communication capabilities. Even so, these and other similar devices may be used or considered a type of smartphone 57 for the purposes of the method described herein.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
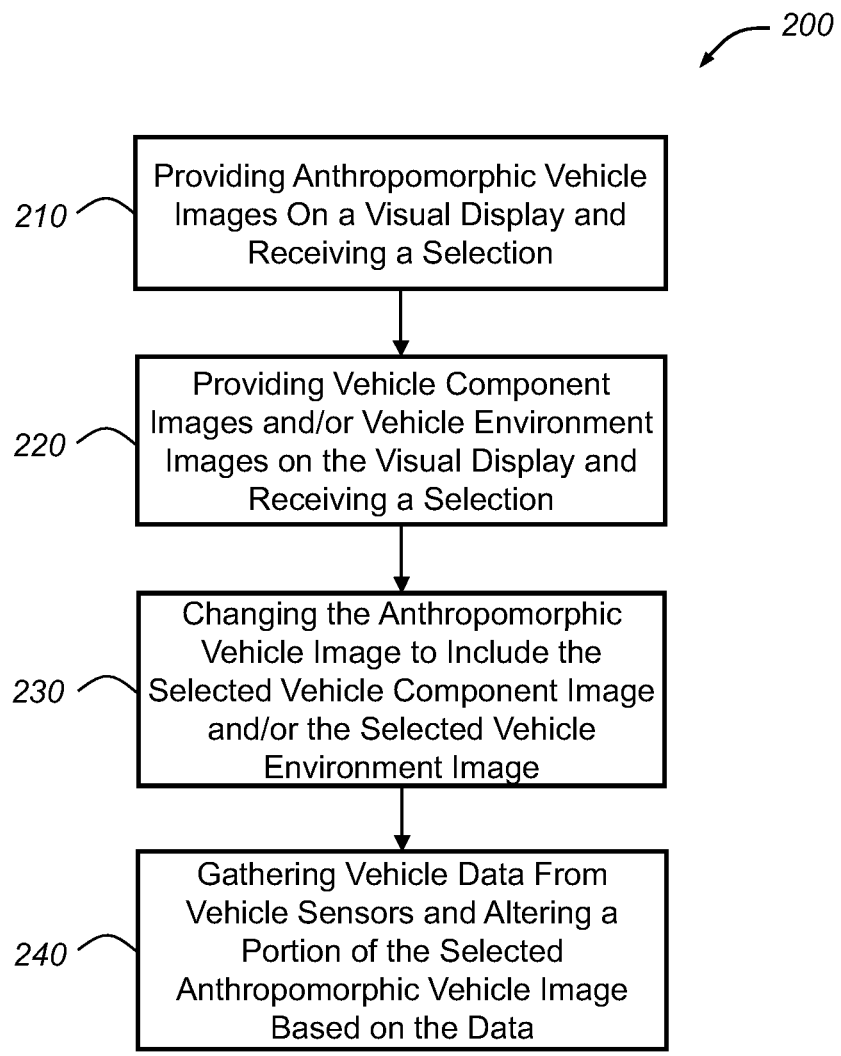
FIG. 2 is a flow chart depicting a method of generating anthropomorphic vehicle images for a vehicle owner.

Turning now to FIG. 2, there is a method 200 for generating anthropomorphic images for a vehicle owner. The method 200 begins at step 210 with providing a plurality of anthropomorphic vehicle images to a vehicle owner on a visual display and receiving a selection from among the plurality of anthropomorphic vehicle images from the vehicle owner. Anthropomorphic vehicle images can include artistic images of the vehicle 12, such as cartoon drawings resembling the vehicle 12. In one example, the cartoon drawings can depict the vehicle 12 as having exaggerated features, such as enlarged wheels, skewed exterior vehicle body curves, and/or other distortions not found on the vehicle 12 as it is manufactured and delivered to a vehicle owner. In one example, the vehicle 12 can be shown on the visual display as a single anthropomorphic vehicle image. That is, the vehicle owner can view a plurality of single, unitary anthropomorphic vehicle images on the visual display and select the image most appealing to the owner. Here, the anthropomorphic vehicle images are complete and may not allow customization by the vehicle owner. The plurality of single anthropomorphic vehicle images can be displayed as different vehicle models and each model can be represented its own anthropomorphic vehicle image.

A variety of anthropomorphic vehicle images can be presented to the vehicle owner. For instance, if the vehicle owner owns a Chevrolet Camaro™, the owner may want to see one or more anthropomorphic vehicle images that resemble the Chevrolet Camaro™. In another example, the vehicle owner may wish to see anthropomorphic vehicle images that are unrelated to the actual model the vehicle owner owns. For instance, the vehicle owner may drive a minivan but want to see anthropomorphic vehicle images of sports cars. Each anthropomorphic vehicle image may be in different colors and/or have exaggerated features. The anthropomorphic vehicle image for each vehicle 12 can also be customized by displaying artistic images of one or more vehicle components. The vehicle components can be represented as cartoon drawings having the exaggerated features and other artistic features described above with regard to the artistic images of the vehicle. For example, an anthropomorphic vehicle image depicting a vehicle model can be displayed on the visual display. Once the vehicle owner selects a particular vehicle model, the vehicle owner can then be shown one or more anthropomorphic vehicle images representing the body of the vehicle 12. The images representing the body of the vehicle can be customized with various artistic images of vehicle components, such as the wheels of the vehicle 12, the color of the vehicle 12, the addition of external airflow spoilers/air dams, fuzzy dice, and other similar components thereby altering the anthropomorphic vehicle image chosen by the vehicle owner.

Other portions of the anthropomorphic vehicle image can be altered as well, such as the vehicle environment surrounding the image. For example, it is possible to display various backgrounds with the anthropomorphic vehicle image, such as backgrounds of various colors, patterns, and other artistic design. It is also possible to display vehicle environments, such as photographs depicting scenic backdrops for selection by the vehicle owner for inclusion with the anthropomorphic vehicle image.

It should also be appreciated that the anthropomorphic vehicle image can include an artistic image of the interior of the vehicle 12. The vehicle owner can be presented with anthropomorphic vehicle images of the interior of the vehicle 12 on the visual display. Anthropomorphic images of the interior of the vehicle 12 can include one or more artistic images of informational gauges or other instrument panel components that can display vehicle-related information or data. For example, the vehicle owner can be presented with artistic depictions of fuel gauges, radio receiver displays, vehicle coolant temperature gauges, as well as other informational images or widgets from which the vehicle owner can select and incorporate with the anthropomorphic vehicle image of the vehicle interior that is chosen. The list of possible customization provided here is far from exhaustive and it should be understood that many different images can be offered to the vehicle owner on the visual display and the owner can choose from those images to create his or her own representation of their anthropomorphic vehicle image. The method 200 proceeds to step 220.

At step 220, a plurality of vehicle component images and vehicle environment images are provided on the visual display. The vehicle owner can select vehicle component images and/or vehicle environment images using the visual display. The anthropomorphic vehicle images can be shown on the display 38 included as part of the vehicle 12 or on the smartphone display 59 discussed above. In one example, the anthropomorphic vehicle images can be stored at a central facility having computing resources, such as the service center computer described above with regard to computer 18. The computer 18 can respond as a server to generate the anthropomorphic vehicle images and transmit the images to the vehicle telematics unit 30, which can then produce them on the display 38. It is also possible that the vehicle telematics unit 30 can wirelessly communicate the anthropomorphic vehicle images to the smartphone 57 using short-range wireless communication protocols after the anthropomorphic vehicle images have been transmitted to the vehicle telematics unit 30. The smartphone 57 can receive the anthropomorphic vehicle images and produce those images on the smartphone display 59. In another example, the anthropomorphic vehicle images can be generated by a software application that can be stored in a memory portion of the smartphone 57. The software application can generate the anthropomorphic vehicle images for display on the smartphone display 59.

Using the display 38 or smartphone display 59, the vehicle owner can select one or more anthropomorphic vehicle images by touching the surface of the display 38 or the smartphone display 59 thereby physically selecting the image. It is also possible to use a mouse, trackball, or other similar peripheral implement to control the movement of a cursor on display 38 or smartphone display 59 and select the anthropomorphic vehicle image. While the display and selection of anthropomorphic vehicle images have been described with respect to vehicle telematics unit 30 and smartphone 57, it is also possible to display a plurality of anthropomorphic vehicle images on a personal computer (PC). The PC can also be used to receive selections of anthropomorphic vehicle images from the vehicle owner. For example, the client computer described above with regard to computer 18 can receive the plurality of anthropomorphic vehicle images from the server and display the received images for the vehicle owner on an attached display (e.g. computer monitor). The method 200 proceeds to step 230.

At step 230, the selected anthropomorphic vehicle image is changed to include the selected vehicle component image, the selected vehicle environment image, or both. If the vehicle owner has been offered the option to change the vehicle component image or the vehicle environment image, the anthropomorphic vehicle image can be altered or changed to reflect the vehicle owner's choice. For example, if the vehicle owner has been presented with an anthropomorphic vehicle image, such as one artistically representing the Chevrolet Camaro™, as well as a plurality of different artistic images of informational gauges, such as vehicle wheels, the user can select one of the wheels. After selecting the wheel, the anthropomorphic vehicle image (e.g. the artistic representation of the Chevrolet Camaro™) can be changed to include the vehicle owner's wheel choice. A similar presentation and selection process can be carried out with other vehicle components. In another example, the vehicle owner can be presented a choice of vehicle environments from which he chooses one. The vehicle owner's chosen vehicle environment can then be shown behind the anthropomorphic vehicle image. The changed anthropomorphic vehicle image can then be shown on the visual display. The method 200 proceeds to step 240.

At step 240, vehicle data is gathered from vehicle sensors on-board the vehicle 12 and a portion of the selected anthropomorphic vehicle image is altered based on the gathered vehicle data. At least some of the gathered vehicle data is visually communicated to the vehicle owner by altering one or more artistic images of informational gauges that are included with the anthropomorphic vehicle image. In general, vehicle data can be visually or audibly communicated to vehicle owners in a variety of ways, such as fuel levels using a fuel gauge. In addition to mechanical or electromechanical gauges in the vehicle 12, the anthropomorphic vehicle image can include artistic images of informational gauges that display fuel levels or other vehicle-related data.

When the vehicle owner selects an artistic image of an informational gauge as part of the anthropomorphic vehicle image, the display of the gauge can be changed to reflect vehicle data gathered at the vehicle 12. The vehicle data can relate to vehicle function or vehicle operation. For example, if the vehicle owner selected an artistic image of a fuel gauge as part of the anthropomorphic vehicle image, the artistic representation of the gauge can also convey the fuel level in the vehicle 12. Many other implementations are possible. For instance, if a vehicle sensor determined that it was dark out, such as can be the case at night, the anthropomorphic vehicle image can be altered to convey this fact, such as by altering the anthropomorphic vehicle image to illuminate the headlamps of the vehicle 12 and/or alter the vehicle environment to depict a nighttime background that includes an artistic representation of the moon. Altering the anthropomorphic vehicle image can be carried out in a variety of ways. For instance, the vehicle data can be gathered by one or more vehicle sensors, such as those described above as VSM 42. The vehicle telematics unit 30 can receive the vehicle data from the VSM 42, alter the anthropomorphic vehicle image, and display the altered image on the display 38. In another example, the vehicle telematics unit 30 can convert the vehicle data received from the VSM 42 to a form readable by the smartphone 57, which can then alter the anthropomorphic vehicle image and display the altered results on the smartphone display 59. As noted above, the anthropomorphic vehicle image can also be displayed using the personal computer described above. Using that implementation, the vehicle telematics unit 30 can transmit the vehicle data using the wireless carrier system 14 to the computer 18, which can then provide the altered image to the client PC.

Many different forms of vehicle data can be used to alter the anthropomorphic vehicle image. In yet another example, the location of the vehicle 12 can be determined and the anthropomorphic vehicle image can then be superimposed over a geographical map based on this location. The location of the vehicle 12 can be determined using the GPS module 40 carried by the vehicle 12. And the geographical map can be created based on the location of the vehicle 12. The created geographical map can be shown on the visual display and the position of the anthropomorphic vehicle image on the map can move based on the location of the vehicle 12. It is also possible to incorporate anthropomorphic vehicle images chosen by other vehicle owners and the geographical positions of the vehicles 12 of those owners on the created geographical map. For example, the vehicle owner can make the anthropomorphic vehicle image and the geographical position of the vehicle 12 available to one or more other vehicle owners. That way the each vehicle owner can be shown a visual display that depicts a common geographical map along with one or more anthropomorphic vehicle images showing the geographical positions of each vehicle 12. By way of an example, this can be carried out when two or more vehicles 12 are travelling to a common location and/or event, such as a sporting event. As the vehicles 12 travel to the event, each vehicle owner can be able to see the position on the map of other vehicles 12, including his own, which can be conveyed by the anthropomorphic vehicle image of each vehicle 12. One way of carrying this out can be to obtain the location of a plurality of vehicles 12 using the GPS module 40 at each vehicle and then transmitting the vehicle locations to the computer 18. The computer can relate the geographical positions of each vehicle 12, determine the anthropomorphic vehicle image for each vehicle 12, superimpose the anthropomorphic vehicle image onto a geographical map, and wirelessly transmit this map to each of the vehicles 12. As the vehicles 12 move, the geographical map can be refreshed with respect to the locations of each vehicle 12 and re-sent to each vehicle 12 according to a predetermined temporal frequency. The method 200 then ends.

Figure 3:
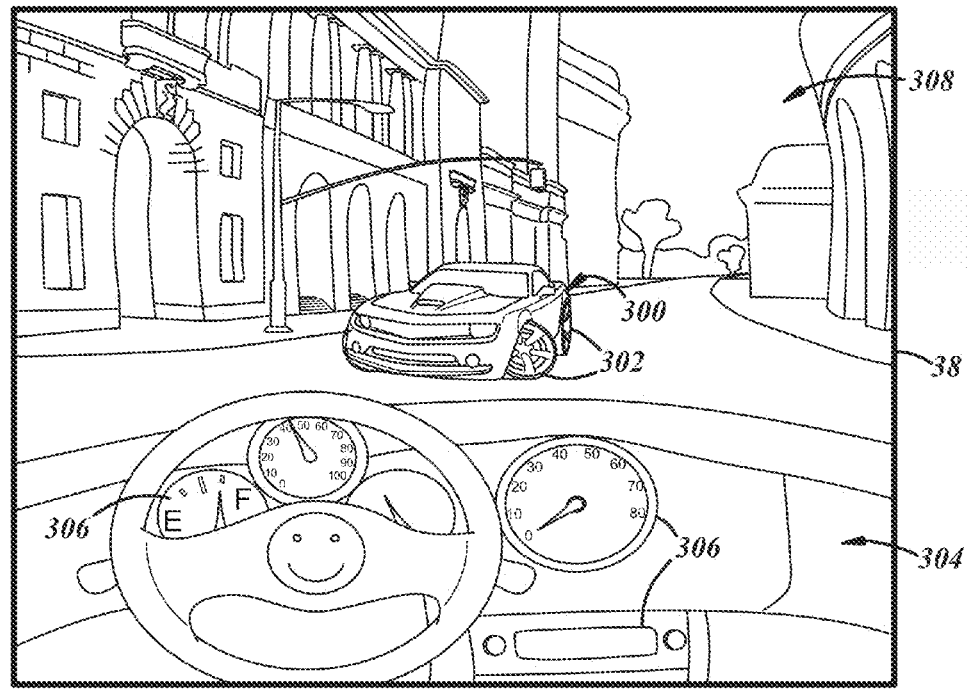
FIG. 3 is an example of a anthropomorphic vehicle image that may be generated by the method described herein.

Turning to FIG. 3, an exemplary anthropomorphic vehicle image 300 is shown. The anthropomorphic vehicle image 300 can be shown on the vehicle visual display 38, the smartphone display 59, or elsewhere. The anthropomorphic vehicle image can include vehicle component images 302 of wheels selected by the vehicle owner to personalize the image. An artistic image of the interior of the vehicle 304 can be placed in close proximity to the anthropomorphic vehicle image 300 on the display 38. The image of the interior of the vehicle may be, for example, an instrument panel 304 that depicts one or more artistic images of some of the instrument panel components 306. The components 306 can include an image of a fuel gauge, an artistic image of a radio display, and an artistic image of a vehicle tachometer. Each of the components 306 may be altered or changed to display information that conveys vehicle data to the vehicle owner. For example, the artistic image of the fuel gauge can depict the amount of fuel in the vehicle 12, the artistic image of the radio display can depict the radio station the radio in the vehicle 12 is tuned to, and the tachometer can display the engine revolutions-per-minute of the vehicle engine. The anthropomorphic vehicle image 300 can be displayed among a vehicle environment image 308 that may or may not have been selected by the vehicle owner. Map data can also be used to provide an artistic rendering of the road, businesses and points of image in the vicinity of the vehicle, as indicated in FIG. 3.

Figure 4:
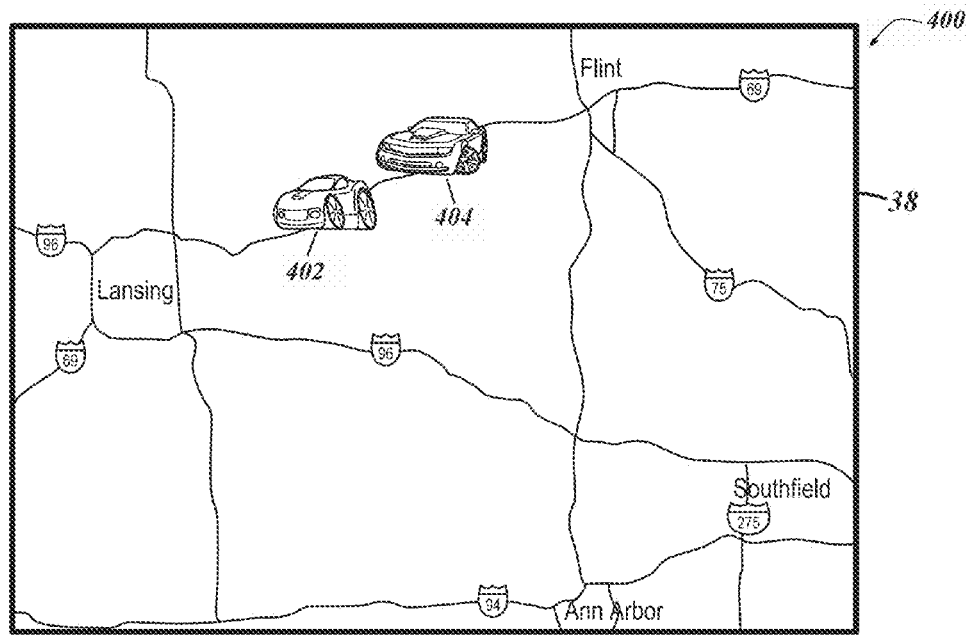
FIG. 4 is an example of a geographical map display that includes one or more anthropomorphic vehicle images.

Turning to FIG. 4, an exemplary geographic map 400 is shown displaying the position of a first anthropomorphic vehicle image 402 and a second anthropomorphic vehicle image 404 on the visual display 38. The geographic map can be generated by commercially available services, such as the geographic map generated by Google™ shown here. The geographic map shows both the first anthropomorphic vehicle image 402 and the second anthropomorphic vehicle image 404 located along Interstate I-69 between Flint and Lansing, Mich., USA.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of generating anthropomorphic vehicle images for a vehicle owner, comprising the steps of:
 (a) identifying a vehicle model owned or operated by the vehicle owner;
 (b) providing a plurality of anthropomorphic vehicle components depicting a portion of an exterior surface of the vehicle model on a visual display for the vehicle owner to select;
 (c) receiving a selection of an anthropomorphic vehicle component from the vehicle owner using a wireless device;
 (d) obtaining vehicle data using one or more vehicle sensors located on a vehicle associated with the vehicle model;
 (e) altering at least a portion of an anthropomorphic vehicle image comprising selected anthropomorphic vehicle components based on the accessed vehicle data; and
 (f) displaying the altered anthropomorphic vehicle image on the wireless device to the vehicle owner.

2. The method of claim 1, wherein the anthropomorphic vehicle image represents a vehicle model.

3. The method of claim 1, further comprising the steps of:
 relating the geographical positions of two or more vehicles using the obtained vehicle data;
 identifying the anthropomorphic vehicle image belonging to each of the vehicles; and
 superimposing the anthropomorphic vehicle image belonging to each of the vehicles onto a geographical map based on geographical positions; and
 wirelessly transmitting this map to each of the vehicles.

4. The method of claim 1, further comprising the steps of presenting a plurality of vehicle component images or vehicle environment images on the visual display from which the vehicle owner can choose and receiving from the vehicle owner a selection from among the plurality of vehicle component images and vehicle environment images.

5. The method of claim 1, wherein the portion of the selected anthropomorphic vehicle image comprises an artistic image of an informational gauge.

6. The method of claim 1, further comprising the step of displaying the altered anthropomorphic vehicle image on a smartphone display.

7. The method of claim 1, further comprising the step of generating the plurality of anthropomorphic vehicle images using software stored at a smartphone and providing the plurality of anthropomorphic vehicle images on a smartphone display for the vehicle owner to select.

8. A method of generating anthropomorphic vehicle images for a vehicle owner, comprising the steps of:
   (a) providing a plurality of anthropomorphic vehicle images to the vehicle owner on a visual display, wherein each of the anthropomorphic vehicle images includes one or more artistic images of informational gauges that represent a function of a vehicle;
   (b) receiving from the vehicle owner a selection from among the plurality of anthropomorphic vehicle images;
   (c) providing a plurality of vehicle component images and vehicle environment images on the visual display from which the vehicle owner can choose;
   (d) receiving from the vehicle owner a selection from among the plurality of vehicle component images and vehicle environment images;
   (e) changing the selected anthropomorphic vehicle image to include the selected vehicle component image, the selected vehicle environment image, or both;
   (f) gathering vehicle operational data from vehicle sensors onboard the vehicle;
   (g) visually communicating at least some of the gathered vehicle operational data to the vehicle owner by altering one or more artistic images of informational gauges included with the anthropomorphic vehicle image; and
   (h) displaying the altered anthropomorphic vehicle image on the visual display.

* * * * *